United States Patent [19]

Pahr

[11] Patent Number: 5,079,649
[45] Date of Patent: Jan. 7, 1992

[54] ERASE DEVICE FOR A MAGNETIC LAYER MEMORY HAVING RELATIVE MOTION

[75] Inventor: Per Olaf Pahr, Lier, Norway
[73] Assignee: Tandberg Data AS, Norway
[21] Appl. No.: 538,019
[22] Filed: Jun. 13, 1990

[30] Foreign Application Priority Data

Jun. 16, 1989 [EP] European Pat. Off. ........ 89203346.5

[51] Int. Cl.$^5$ ............................................. G11B 5/47
[52] U.S. Cl. ...................................................... 360/66
[58] Field of Search ................................ 360/66, 118

[56] References Cited

U.S. PATENT DOCUMENTS

| | | | |
|---|---|---|---|
| 3,354,270 | 11/1967 | Smith et al. | 179/100.2 |
| 3,480,739 | 11/1969 | Kinkel | 179/100.2 |
| 4,466,027 | 8/1984 | Howell et al. | 360/66 |

FOREIGN PATENT DOCUMENTS

| | | |
|---|---|---|
| 3008692 | 9/1981 | Fed. Rep. of Germany . |
| 1046056 | 12/1953 | France . |
| 57-119515 | 12/1982 | Japan . |
| 58-80108 | 10/1983 | Japan . |
| 61238679 | 4/1988 | Japan . |
| 63-244402 | 10/1988 | Japan . |
| 1310892 | 11/1985 | U.S.S.R. . |

OTHER PUBLICATIONS

Jeffries, K. L., "Symmetric AC Bias Signal for Analog Magnetic Recording", IBM Technical Disclosure Bulletin, vol. 17, No. 5, 1974, p. 1265.

Mee, C. D. et al., "Magnetic Recording", vol. II Computer Data Storage, 1988, p. 206.

*Primary Examiner*—Vincent P. Canney

[57] ABSTRACT

An erase device for a magnetic layer memory having relative motion of a storage medium with respect to a combined magnetic head system includes a magnetic erase head having a single coil winding. Both ends of the winding of the erase head can be connected to a DC supply voltage via a respective inductor and, via a respective switch, to a potential that deviates from the DC voltage. The switches are alternately activated for identical time intervals by complementary control pulse sequences. The drive circuit for the erase head forms a DC-AC converter having symmetrical drive of the erase head.

12 Claims, 3 Drawing Sheets

ERASE DEVICE FOR A MAGNETIC LAYER MEMORY HAVING RELATIVE MOTION

BACKGROUND OF THE INVENTION

1. Field of the Invention:

The present invention relates to an erase device for a magnetic layer memory having a storage medium being moved relatively with respect to a combined magnetic head system including a magnetic erase head having a one-part coil winding that is connected to a DC voltage source via a switch device in order to produce an alternating current of predetermined erase frequency in the winding of the erase head dependent on a high-frequency control pulse sequence being supplied to the switch device.

2. Description of the Prior Art

A multitude of applications is known wherein audio, image or data information is stored in erasable fashion on a magnetic layer storage device that is fashioned as a magnetic tape or as a magnetic disk. For recording or, respectively, reading information, the storage medium is moved relative to a magnetic write/read head. During the recording event, the coil current is modulated in dependence upon information to be recorded, flows through the magnetic head and effects on the storage medium a remanent magnetization changing corresponding to the modulation of the current. During the read event, conversely, a voltage signal of a waveform corresponding to the stored information is induced in the magnetic head by the remanent magnetization on the storage medium. Magnetic layer memories of this type are generally utilized as re-recordable memories, i.e. it must be possible to erase stored information either in predetermined regions of the storage medium or on the entire stored medium. In addition to the read/write head, a separate erase head being individual controlled is provided for that purpose.

Given the multitude of applications of magnetic layer memories of this type, a plurality of devices for erasing stored information is also known. The most simple solution for erasing stored information is in supplying a direct current to the erase head and therefore generating a DC magnetic field that effects a uniform magnetization of all magnetic particles with a given polarity on the passing storage medium. Apart from special instances, this erase procedure has had no essential significance in practice for reasons to be set forth below. The following consideration, therefore, refers to all of those situations wherein an AC magnetic field is generated with the erase head, the AC magnetic field produces, when viewed statistically, a randomly-distributed magnetic orientation of the individual magnetic particles on the passing storage medium. In consequence, no privileged magnetic direction can be detected on the erased region of the storage medium, even when viewed locally.

The oldest embodiment of a magnetic erase head is known from audio tape recorders. This known erase head is constructed of two core halves that each carry respectively one of two subwindings connected in series with one another. Simply viewed, this can be considered an erase head having a single magnetic coil whose resonant frequency is tuned to the erase frequency.

This erase head structure having a single magnetic coil grounded at one side is conventionally utilized only in magnetic tape recorder devices for audio recording. This is to be attributed to the fact that the erase frequencies in this application are orders of magnitude lower than in other applications, for example in magnetic data memories. In magnetic data memories, the erase frequencies lie in a range of 5 MHz and above, whereas erase frequencies up to 75 kHz are entirely adequate for applications in the audible range, even given high-fidelity quality. In erase heads that have resonant frequencies tuned to such low erase frequencies, high $Q$ coil qualities $Q$ can be achieved. Consequently, a low erase current is sufficient. This, in turn, means that the drive circuit for the erase head can be adapted to low currents and be constructed simply and cost-effectively because filters and low-distortion amplifiers can be designed correspondingly.

These advantages no longer apply to erase heads having high erase frequencies as must be employed, for example, in magnetic data memories. Moreover, in such applications, a further property of the erase head having a single magnetic coil forms a serious constraint, this to be attributed to the single-sided grounding thereof. This ground connection of the return branch gives rise for a relatively long loop that is the cause of electromagnetic noise emission given erase heads having a high erase frequency. This electromagnetic noise emission is difficult to deal with even given extremely carefully manufactured connections to ground.

In magnetic data memories, therefore, the erase heads are usually provided with a center-tapped magnetic coil. Switch elements are connected to the coil ends, whereas the center tap is supplied with a DC voltage. The switch elements, preferably switching transistors, are driven by complementary switching signals that therefore alternately apply one of the coil ends to ground or to a potential that is usually lower than that of the DC voltage supplied to the center tap. The alternating on time of the two switch elements respectively amounts to 50% of a switching period in the ideal case. The direction of the magnetic field generated by the magnetic coil is therefore reversed at the end of each half cycle of the switching period. An alternating magnetic field is produced in this manner at the gap of the erase head. An example of this type of a magnetic erase head together with its drive circuit is disclosed in U.S. Pat. No. 4,466,027, fully incorporated herein by this reference.

One problem in this known design of magnetic erase heads is that the desired symmetry of the two sub-windings of the magnetic coil can only be realized incompletely. The effects of this asymmetry that occurs in practice can be reduced by increasing the number of turns. However, the number of turns must be reduced in high-frequency erase heads having a center-tapped magnetic coils, so that winding errors have all the greater influence. In addition to the inherently-high erase frequency, it must also be taken into consideration that the natural resonance of the magnetic coil usually is set at least somewhat higher than the erase frequency in order to have balancing latitude for the compensation of manufacturing tolerances in view of this resonant frequency. Asymmetry is also to be attributed to the fact that the magnetic coil usually is wound bifilarly for reasons of costs. The higher stray capacitance that is unavoidable given a bifilar winding additionally takes effect here.

Due to the significance of the symmetry for the erase event, it is expedient to explain this problem in yet somewhat greater detail. As already results from the hysteresis curve, each magnetic storage medium is a medium having pronounced nonlinear properties. It is the purpose of each erase arrangement to generate a strong magnetic field that fully penetrate into the magnetic storage medium with a magnetic field strength that optimally largely corresponds to the saturation magnetization, so that all magnetic particles, i.e. local magnets, become magnetically saturated. Since the storage medium is moved relative to the erase head, the alternating frequency of the erasing magnetic field must be selected additionally high in comparison to this relative speed. Only then can it be assured that the magnetization of the individual local magnets, as seen on statistical average, does not have any privileged direction. This, however, can only be achieved when the on times of the two switch elements are optimally identical and, moreover, when the field strengths of the two components of the alternating magnetic field also coincide optimally accurately in terms of magnitude. Already if just one of these two conditions is not adequately met, the desired statistical distribution of the magnetization direction of the local magnets during the erase event or, from a more general point of view an undirected magnetization is not achieved and, instead, a DC field component is recorded.

The same situation can also be evaluated in the following manner with respect to a defined local area on the storage medium The effect of the alternating magnetic field in this local area can be interpreted by a field strength vector which becomes inversely proportional to the time span of its influence on the storage medium. In order to meet the desired conditions, the spectrum of this radiation must consist of sinusoidal harmonics such that all of the $2n^{th}$ harmonics are zero, where D is a positive integer.

The reason for such strict requirements is that, as known and is likewise explained in the aforementioned U.S. Pat. No. 4,466,027, each remaining DC field component causes distortions in the renewed recording of new information. When recording analog information, signal distortions resulting from the superimposition of the remanent DC field component with the analog signal to be recorded; in digital recording, the effect thereof is known as peak shift.

This, however, is only one of the influencing variables for the peak shift that occurs in practice. Expressed in general terms, the peak shift is dependent on the recorded wavelength, i.e. is also influenced by the recording method employed and, as known, is also influenced by the band width of the read channel. For example, the peak shift in a read channel having a narrow band-pass characteristic is greatest for long-wave signal portions. Finally, the degree of the peak shift is also influenced by the amplitude of the pre-magnetization current when a pre-magnetization is utilized in the recording event in order to linearize the same. The coercivity of the storage medium and the temperature response during operation of the storage medium also influences the degree of peak shift. As a consequence of the variety of these influencing variables, peak shift values can be very quickly reached in the worst case which cannot be accepted by the storage device. It is therefore important to minimize the influence of each variable likely to generate distortions.

In the present context, the influence of DC field components on the recording quality is known, for example, from "Magnetic Recording", Vol. II: "Computer Data Storage", edited by C. Denis Mee and Eric D. Daniels, McGraw Hill, 1988, page 206. Systemically in the NRZI recording method, for example, a DC component that cannot be left out of consideration is constantly co-recorded as a part of the spectrum of the signals to be recorded, i.e. a DC component or low-frequency components that have amplitudes too significant to be left out of consideration are already inherently contained in the recording signal just because of the use of this recording method. It can be immediately seen that any DC field magnetization remaining on the magnetic storage medium after the erase event then acts as a further distortion in the signal recording because it superimposes on the signal components.

Finally, yet another aspect should be pointed out, which is important for the circuit design of, for example, magnetic tape recorder cassette devices for data storage but also of battery-operated audio tape recorder devices. In the former periphery storage devices, only supply voltages of +5 volts and +12 volts are usually available. The same applies to battery-operated audio or, respectively, video recorder devices. This means a design limitation in view of the components selection. For reason of cost, finally, attempts are to be made to optimize the coil impedance to a high value insofar as possible in an erase head having a high erase frequency and to keep the required coil current optimally low. Only by keeping the coil current low is it possible to utilize less expensive switching transistors in the drive circuit. This is particularly true when the drive circuit is to be constructed as an integrated circuit, since the permissible current load of integrated circuits is frequently even lower than circuits composed of discrete components.

SUMMARY OF THE INVENTION

It is therefore an object of the invention, in an erase device of the type initially set forth, to provide a magnetic erase head structure suitable for high erase frequencies and to also provide a drive circuit adapted thereto that, given a low-expense power supply makes it possible by simple means to generate, at the gap of an erase head, an alternating magnetic field of adequate field strength and, in addition of a small portion of distorting signal components of the $2n^{th}$ order.

This object is achieved, according to the present invention, in an erase device for a magnetic layer memory having relative motion of the storage medium vis-a-vis a combined magnetic head system including a magnetic erase head having a one-part coil winding that is connected to a DC voltage source via switch devices that produce an alternating current having a prescribed erase frequency in the winding of the erase head dependent on a high-frequency control pulse sequence, and is particularly characterized in that each end of the winding of the erase head can be supplied with an inductance to the DC voltage source and, via a respective switching stage, to a potential that deviates from the DC voltage source, and in that the switching stages can be alternately activated for identical time intervals by the control pulse sequence.

In terms of circuit structure, the solution of the present invention has a seductive simplicity. Two preferably liberally-dimensioned inductances are utilized in the drive circuit for the erase head. These inductances create in combination with the switching stages activated in alternation, a DC-AC converter forming a symmetrical driver circuit for the erase head. The AC characteristic of the inductances is thereby particularly exploited for the purpose of generating an adequately high alternating erase current that is—to a great extent—independent of the supplied DC voltage even despite the relatively high AC impedance of the erase head. This property is of special interest for the flexibility of the erase device of the present invention. It therefore allows the erase device, constructed in accordance with the present invention to be utilized in the greatest variety of applications, even together with different erase frequencies, and liberally selected supply voltages without the circuit principle therefor having to be changed.

In accordance with one embodiment of the invention, the coil winding of the erase head has a smoothing capacitor connected in parallel therewith, whereby the capacitor is dimensioned such that, in combination with the inductance and the stray capacitance of the erase head, it forms a parallel resonant circuit in which the natural resonance is tuned to the erase frequency. This tuning preferably is selected such that the forced resonance of the erase head lies somewhat higher than the erase frequency. A certain range of latitude is thereby created that compensates for manufacturing tolerances. In addition, this parallel resonance circuit has a further function. In combination with the drive circuit of the erase head, it has a balancing effect on the erase function in such a manner that harmonic signal components of the $2n^{th}$ order are suppressed in the erase current and, therefore, in the erasing magnetic field that is generated.

In accordance with a further embodiment of the invention, this suppression of distorting harmonic signal components can be further improved in that a symmetrical harmonic suppressor is arranged between the drive circuit and the erase head. Even if this harmonic suppressor suppresses harmonic signal components both of even-numbered order and odd-numbered order, this does not mean a limiting disadvantage. Given the circuit principle of the present invention, an adequate reserve is established for selecting the amplitude of the erase current per se.

In accordance with another embodiment of the invention, finally, this property of symmetry being so critical for performing the erase event is further improved in that the two control pulse sequences that respectively activate the switching stages in alternation are locally derived from a single clock pulse sequence by means of a D flip-flop having a short switching delay time. It is thereby particularly advantageous to monitor the function of this D flip-flop with a further flip-flop and to simultaneously symmetrically load the D flip-flop that steps down the clock signal sequence. The two flip-flops preferably form a common, integrated circuit. The switching operation of the auxiliary flip-flop can be evaluated by a peak value detector having a short recovery time in order to only activate the erase device subject to the proper operation of the first D flip-flop that steps down the clock pulse sequence.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
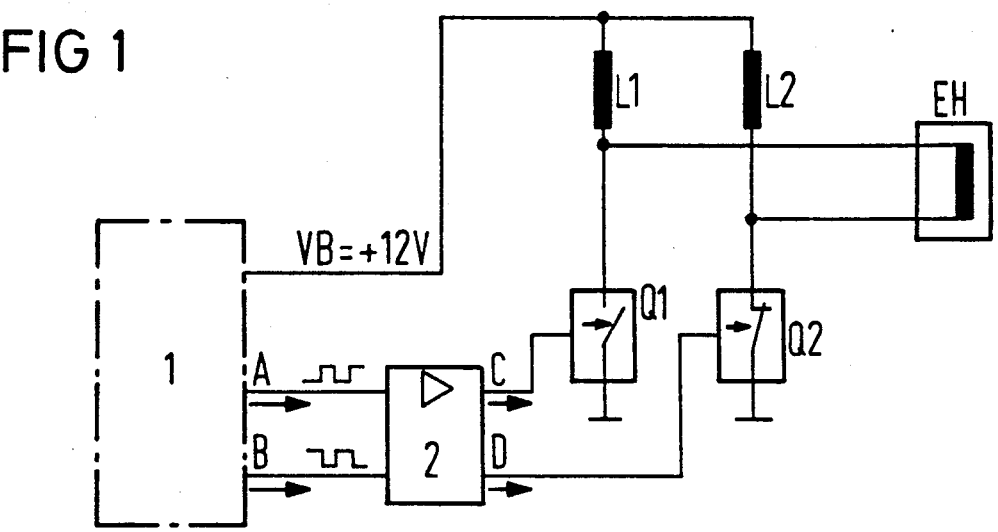
FIG. 1 is a basic circuit diagram of an erase device for a magnetic layer memory having an erase head with a single coil to which a drive circuit having a DC supply is connected, which circuit fundamentally represents a DC-AC converter for driving the erase head in response to an AC signal.

Referring to FIG. 1, the block circuit diagram shows a control unit 1 of, for example, a magnetic tape recorder device, the control unit 1 being shown as a block with broken lines, thereby indicating that this control unit does not form a part of the present invention. Such control units are designed, in particular, for outputting control signals for the erase device, are generally known per se from a multitude of magnetic layer memories, for example magnetic tape recorder devices, and further description in detail is deemed to be unnecessary.

The control unit 1 supplies, in addition to a supply voltage VB, two drive signals A and B, respectively, that are exactly anti-phase relative to one another. These signals, in a form of two square-wave pulse sequences, are buffered and amplified in a driver circuit 2. The driver circuit 2 outputs two output signals C and D which are derived from the drive signals A and B, respectively, and are likewise optimally shifted in phase by exactly 180° relative to one another, i.e. are complementary. These signals are respectively supplied as switching signals to one of two switching stages Q1 or Q2, respectively. In the block circuit diagram of FIG. 1, these switching stages are only schematically illustrated; they can be implemented by means of a multitude of commercially available components, for example switching transistors, that can also be constructed as field-effect transistors. Respectively in series with one of two inductances L1, L2, the switching stages are arranged between the supply voltage VB and ground. An erase head EH is schematically indicated with a single coil whose ends are respectively connected to one of the junctions of the inductances L1 and L2 and thereby respectively to the allocated switching stages Q1 and Q2.

Figure 2:
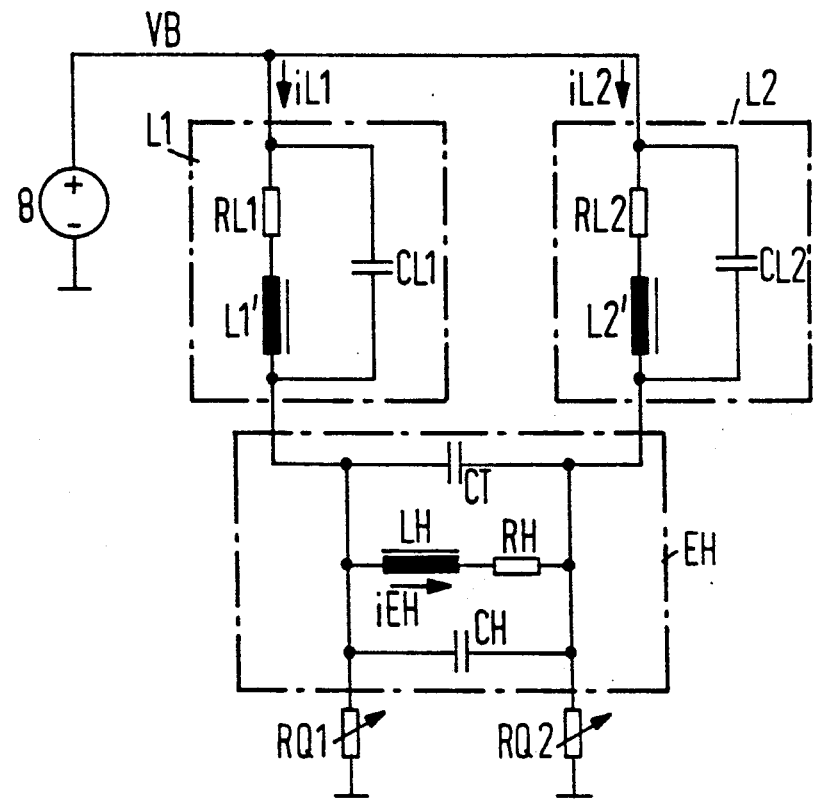
FIG. 2 is an equivalent circuit diagram of the circuit arrangement of FIG. 1.

For explaining the operation of the erase device shown in FIG. 1, FIG. 2 shows an equivalent circuit diagram of this device. A voltage source 8 generates the supply voltage VB that is supplied in parallel to the inductances L1 and L2. Coil currents iL1 and iL2, respectively, thereby produced are schematically indicated with arrows. In the equivalent circuit diagram of the inductances L1 and L2, a respective loss resistor RL1 or RL2 is connected in series with the coil inductances L1' and L2', respectively. A respective stray capacitance CL1 or CL2 is connected in parallel to this series circuit.

The erase head EH is symmetrically connected to the inductances L1 and L2. The equivalent circuit diagram shows a series circuit of a coil inductance LH and of a loss resistor RH of the erase head lying in series between both terminals. Connected in parallel therewith are, on the one hand, a stray capacitance CH and a smoothing capacitor CT for setting the natural resonance of the erase head EH. This equivalent circuit diagram describes the property of the erase head EH together with the connecting line in the form of a loss-affected parallel resonant circuit. In order to illustrate a reference quantity, an arrow pointing toward the right defines a possible current direction for the erase current iEH as a reference direction.

The equivalent circuit diagram of FIG. 2 is completed by two resistors referenced RQ1 and RQ2, respectively, that are respectively connected to one of the junctions of the inductances L1 and L2 with the erase head and, on the other hand, are applied to ground. Arrows in the equivalent circuit diagram of FIG. 2 indicate that these resistors RQ1 and RQ2 can assume different values of resistance. These resistors therefore schematically represent variable channel resistances of the switching stages Q1 and Q2.

Together with the pulse diagrams illustrated in FIG. 3, the operation of the erase device shall be set forth in greater detail below with reference to the described equivalent circuit diagram. The circuit arrangement has a certain build-up characteristic that, however, is of subordinate significance for the basic operation since the circuit already operates stably after a few cycles of the erase frequency prescribed by the pulse repetition rate of the drive signals A and B. This stable condition is of critical significance here and the pulse diagrams of FIG. 3 are therefore directed thereto.

Figure 3A:
FIGS. 3a-3e are graphic illustrations in the form of pulse diagrams for explaining the operation of the circuit arrangement of FIGS. 1 and 2.
Figure 3B:
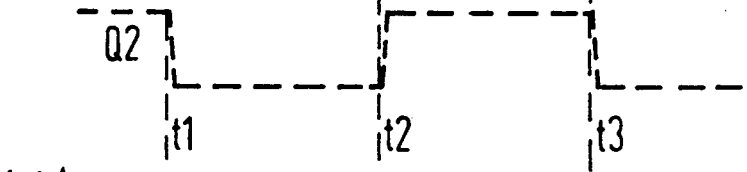
Figure 3C:
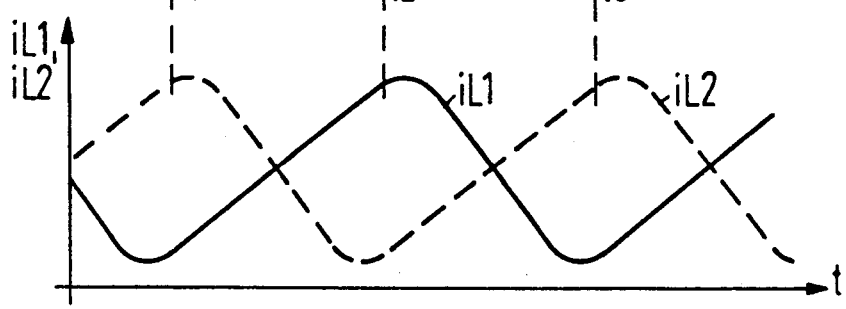
Figure 3D:
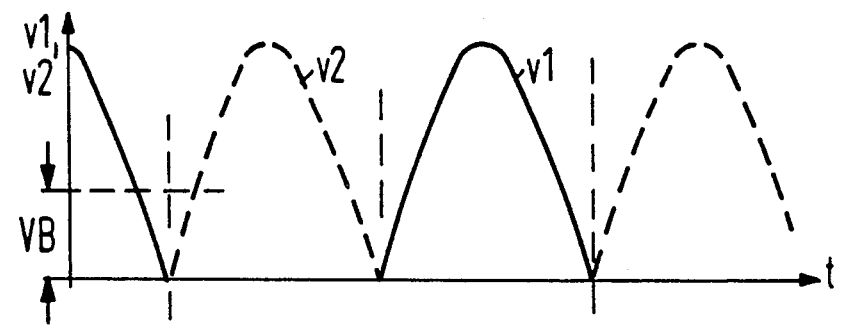
Figure 3E:
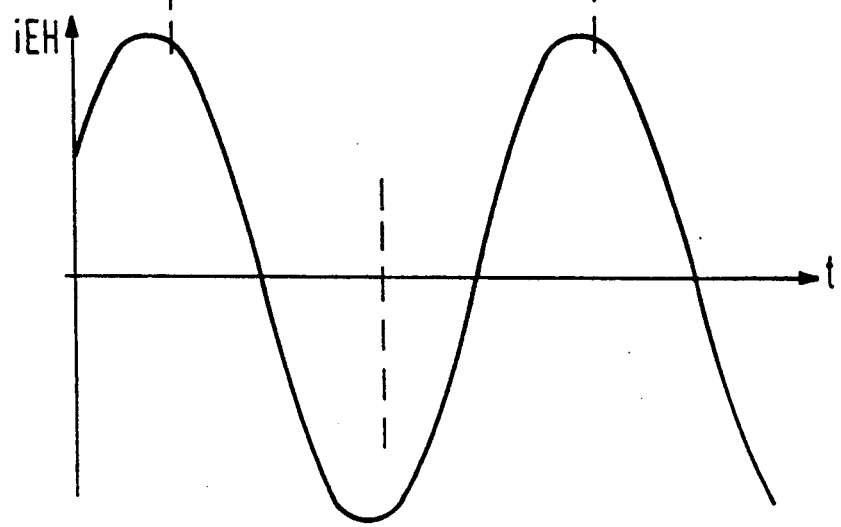

The complementary switching characteristic of the switching stages Q1 and Q2 is illustrated in FIG. 3a and FIG. 3b by a respective square-wave pulse sequence, the switching times being schematically indicated. In FIG. 3c, the coil currents iL1 and iL2 that are phase-offset relative to one another and flow through the inductances L1 and L2 are shown with solid or, respectively, broken lines. FIG. 3d shows waveforms of voltages v1 and v2 building up at the inductances L1 and L2 that represent energy temporarily stored therein, i.e. that are proportional to the square of the coil current iLI and, respectively, iL2. FIG. 3e, finally, illustrates the waveform of the erase current iEH which is produced in the erase head EH and which is shown in agreement with the reference direction indicated by the arrow in FIG. 2.

Assuming the stable condition of the erase device as shown in the pulse diagrams, the first switching stage Q1 is activated at a time t1. At this time it assumes the charging current that flows through the allocated, first inductance L1 and also assumes the current that "pumps" the erase head EH. Beginning at this time t1, therefore, the coil current iL1 flowing through the first inductance L1 increases, however to some extent, is delayed. The switching operation of the second switching stage Q2 that is inhibited beginning at the time t1 is the opposite thereof. The energy stored up to then in the second inductance L2 due to the preceding charging now attempts to discharge. The AC impedance of the erase head EH, however, is relatively high; consequently, a voltage corresponding to the stored energy is now built up at the second inductance L2, this voltage superimposes on the supply voltage VB, as schematically illustrated in FIG. 3d. The resulting drain voltage v2 is illustrated in FIG. 3d; it effects the erase head current iEH that is "pumped" into the erase head EH by the inductance L2 and flows off via the first switching stage Q1.

Since the resonant frequency of the erase head EH is tuned to the erase frequency, the energy stored in the second inductance L2 has essentially flowed off by the time t2 and the drain voltage v2 is therefore also diminished. The next edge change of the drive signals A, B also occur at this time, deactivating the first switching stage Q1 and rendering the second switching stage Q2 conductive. The conditions are therefore reversed in the second half of the erase cycle up to the time t3. The first inductance L1 discharges its energy into the erase head EH in the time interval between the times t2 and t3, as a result thereof the direction of the erase head current iEH in the erase head EH is reversed. The coil current iL1 in this time interval therefore drops from its maximum value to a minimum until it rises again with the beginning of the following erase cycle, as described above.

The described principle of the operation of the drive circuit for the erase head EH therefore also comprises the function of a DC-AC converter supplying an alternating current whose amplitude spectrum has the desired, above-described properties, to the erase head EH. Due to the inductive characteristic of the switched inductances L1 and L2, it is also possible to generate an adequate erase head current iEH even for high erase frequencies by use of a low supply voltage VB, provided that these inductances are suitably dimensioned. Basically, the described erase device does not require any coupling capacitor that disconnects the supply DC voltage VB from the inputs of the erase head EH. Nonetheless, the described circuit arrangement is extraordinarily fail-safe with respect to any undesired erasing of a recording medium moving past the erase head EH. Both ends of the single coil of the erase head EH are connected to the supply voltage VB via the inductances L1 or L2, respectively, that have an extremely-low ohmic resistance. An extremely good protection against distortions in the cut-in phase also results therefrom.

Finally, the special significance of the symmetrical switching characteristic in such an erase device was set forth at the outset. In the present case, this symmetry such as is established in that the erase head EH only comprises a single coil that is operated on an AC basis. In addition, the symmetry is also particularly influenced by the characteristics of the two switching stages Q1 and Q2 and of the two inductances L1 and L2. What is thereby essential is that the characteristics of the switching stages Q1 and Q2, on the one hand, and of the inductances L1 and L2, on the other hand, are the same with good approximation when relatively considered. What relatively considered is intended to mean here is that the switching stages Q1 and Q2 or, respectively, the inductances L1 and L2 utilized in pairs in a circuit have optimally identical characteristics. The switching stages Q1 and Q2 are preferably implemented in the form of switching transistors. It can be assumed that a pair of switching transistors from the same production line meets these requirements. The analogous case also applies to the inductances L1 and L2 placed in pairs.

In the exemplary embodiment described above the supply voltage VB amounts to +12V. This, however, is only one possibility. On the basis of a corresponding design of the erase head EH, however, one has the opportunity to, first of all, lower the erase head current iEH by increasing the number of turns of the erase head winding LH. With the increase in the number of turns of the erase head winding, on the other hand, the coil quality $\underline{Q}$ thereof and, therefore, the filter effect of the tuned erase heads system can also be simultaneously further improved. A further consequence of this measure is that the supply voltage VB can also be reduced, for example, to +4 volts without deteriorating the desired erase function.

Figure 4:
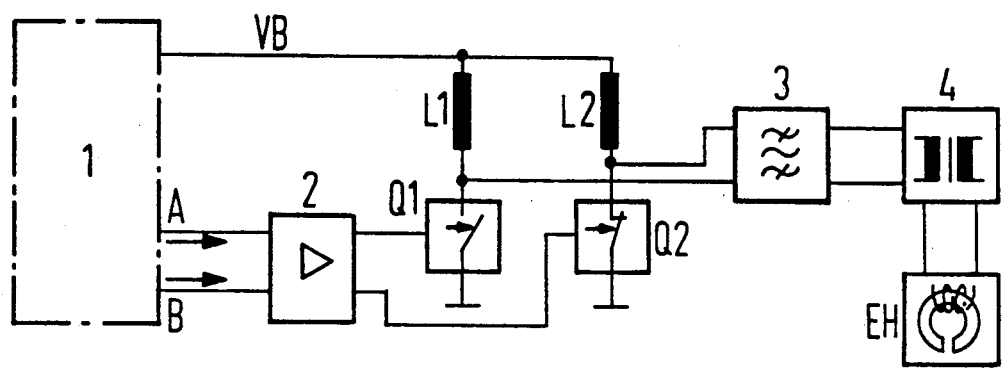
FIG. 4 is a block circuit diagram of a further embodiment of the basic circuit illustrated in FIG. 1.

FIG. 4 illustrates a further embodiment of the erase device. In addition to the circuit principle already set forth with reference to FIG. 1, it contains an additional symmetrical filter 3 (bandpass filter) as well as a transformer 4 that are arranged in series between the drive circuit having the inductances L1 and L2 and the switching stages Q1 and Q2, on the one hand, and the erase head EH, on the other hand. As set forth, the leads for the erase head EH with a certain line capacitance composing stray capacitance as well as the smoothing capacitor CT together with the inductance of the erase head coil LH, as shown in FIG. 2, form a loss-affected parallel resonant circuit. In other words, this is a filter for suppressing harmonics, particularly of the $2n^{th}$ order. The effect of this basis filter can be further promoted by the symmetrical filter 3 that can be constructed in a known manner. However, standard symmetrical filters simultaneously also suppress harmonics of the $(2n+1)^{th}$ order. This denotes a certain loss in the given case, since these harmonics can contribute to the effective erase head current iEH. It has been shown, however, that the circuit principle is adequately flexible in order to increase the coil current to such an extent as warranted in order to be able to accept this loss for the sake of an even better noise suppression.

FIG. 4 illustrates a schematically-indicated transformer 4 which can be used for impedance matching when thin-film magnetic heads form a magnetic head system. A transformer may already be required per se in order to couple the erase current into a rotating erase head. Such rotating magnetic head systems are utilized in, among other things, audio or video recorders, but are occasionally also utilized in data memories.

Figure 5:
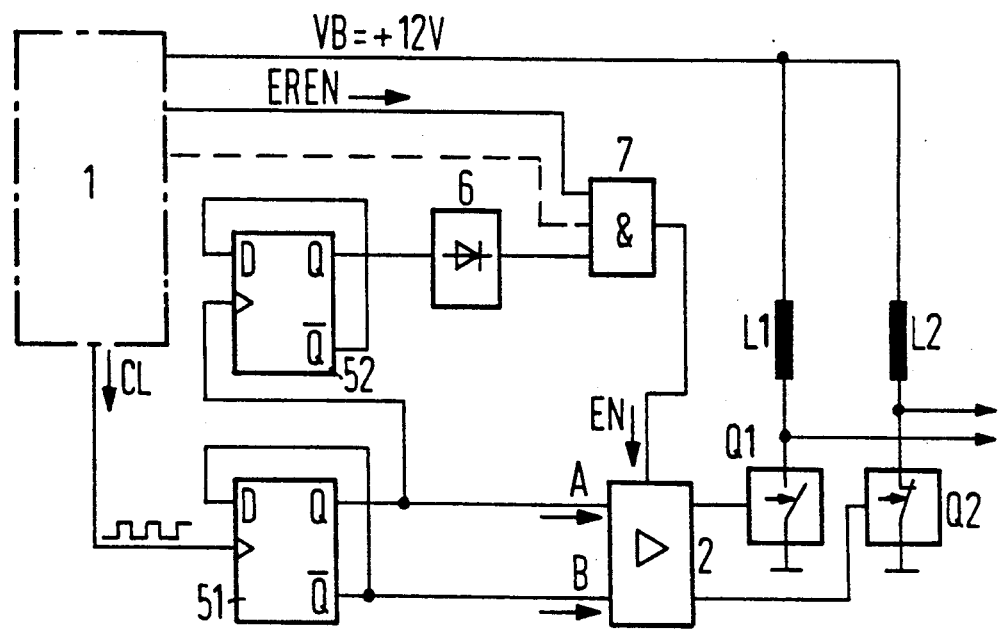
FIG. 5 is a block circuit diagram of a further embodiment of the basic circuit illustrated in FIG. 1.

FIG. 5 illustrates a further embodiment that particularly serves the purpose of improving the further variables influencing for the symmetry effect of the circuit arrangement. A significant variable influencing for the symmetrical function of the circuit arrangement lies in the optimally accurately-observed pulse duty factor of the complementary square-wave pulse sequences of the signals that drive the switching stages Q1 and Q2, respectively. In the present case, it is essential to define the "on" times of the switching stages Q1 and Q2 optimally identically to 50% of the period of the erase frequency. The logic elements of many cost-effective and commercially-available circuit technologies have system-inherent switching times or, respectively, circuit delays that do not meet the stated boundary conditions with adequate precision in the present case.

This problem can be resolved in that two D flip-flops 51 and 52, integrated in one circuit of a fast circuit technology, are employed to generate the drive signals A and B for the switching stages Q1 and Q2, respectively, in the erase device itself and to simultaneously monitor this function. To this end, the control unit 1 outputs a high-frequency clock pulse sequence CL having twice the erase frequency and supplies this pulse sequence CL to the one flip-flop 51 as a control signal. The inverting output thereof is fed back onto its D input. The D flip-flop 51 therefore steps down the clock pulse sequence CL in the ratio 1:2 and thus outputs the derived drive signals A and B, respectively, for the erase device at its two outputs Q and Q. As already described, these drive signals A and B are supplied to the driver circuit 2 connected to the switching stages Q1 and Q2, respectively. The clock pulse sequence CL may fail in a faulty operating condition. This would mean that the switch states of the first D flip-flop 51 and, therefore, of the switching stages Q1 and Q2 remain unchanged. This could lead to an entirely-undesired operating condition, potentially to an outage of the erase device. Such a malfunction is avoided with the second D flip-flop 52 which has its inverting output fed back to its D input. The clock signal for the second D flip-flop 52 forms the signal at the normal output of the first D flip-flop 51. It is thereby achieved that the first D flip-flop 51 is essentially symmetrically loaded, this load condition having a balancing effect on the switching characteristic of the flip-flop 51. Moreover, the second D flip-flop 52 represents a latch for a peak value detector connected to its normal output that should be constructed as an analog detector having a matched, short decay time. What this function of the peak value detector 6 assures is that it outputs a corresponding output signal only as long as it is re-initiated within prescribed intervals.

The output signal at the peak value detector 6 is supplied to an AND gate 7. One therefore has the possibility of coupling in further control signals. An erase function signal EREN output by the control unit 1 is indicated by way of example here in FIG. 5. This is a status signal whose high level places the erase device into the active condition. Adapted to the respective application, the AND gate 7 could additionally be supplied with further control signals that define further operating conditions. Such signals supplied to the AND gate 7 are logically linked with one another therein in order to generate an enable signal EN for the erase device with which the individual stages of the driver circuit 2 are activated.

Both given outage of the clock pulse sequence CL and given specific, prescribed operating conditions of the magnetic layer storage device that vary dependent upon application, it is therefore assured that the switching stages Q1 and Q2 of the erase device can only be driven when an erase event is, in fact, to occur and can also be faultlessly executed.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. Erase apparatus for erasing information stored on a magnetic layer storage medium having relative movement with respect to a combined magnetic head system, comprising:
   a magnetic erase head included in the combined magnetic head system, said magnetic erase head comprising an erase winding including first and second ends;
   a DC voltage source;
   first and second inductances each connected to said DC voltage source and to said first and second ends, respectively, of said erase winding; and
   first and second switch means connected between a reference potential which is different from the DC voltage source and said first and second ends of said erase winding, respectively, and each including a control input for respectively receiving a high-frequency sequence of control pulses, said pulses of said sequences being inversely symmetrical, and said first and second switch means alternating operable in response thereto for identical time intervals to produce an alternating current in said erase winding having a predetermined erase frequency dependent on the high-frequency control pulse sequences.

2. The erase apparatus of claim 1, and further comprising:
a smoothing capacitor connected in parallel with said erase winding for balancing the natural resonance of said erase head to said predetermined erase frequency.

3. The erase apparatus of claim 1, wherein:
each of said first and second switch means comprises identical switching transistors; and further comprising
a driver circuit connected to said control inputs of said first and second switch means and to receive said control pulse sequences, amplifying said control pulse sequences and applying the amplified control pulses to said control inputs of and to drive said first and second switch means.

4. The erase apparatus of claim 1, wherein:
said DC voltage source is a positive DC voltage;
said first and second switch means comprise identical switching transistors each including a controlled current path connected between the junction of a respective inductance and a respective end of said erase winding and ground as said reference potential.

5. The erase apparatus of claim 1, and further comprising:
a symmetric harmonic suppressor connected between the respective junctions of said first and second inductances and said first and second switch means and said first and second ends of said erase winding.

6. The erase apparatus of claim 5, and further comprising:

a transformer connected between said symmetric harmonic suppressor and said first and second ends of said erase winding.

7. The erase apparatus of claim 6, and further comprising:
a D flip-flop including a D input, a trigger input for receiving a clock pulse sequence having a frequency which is twice the erase frequency, and a Q output and a Q output respectively connected to said driver circuit and providing said inversely-symmetrical pulse sequences, and a feedback connection from said Q output to said D input.

8. The erase apparatus of claim 7, wherein said D flip-flop is a first D flip-flop, and further comprising:
a second D flip-flop including a D input, a trigger input, a Q output and a Q output, said Q output connected to said D input, and said trigger input connected to said Q output of said first D flip-flop; and
a peak value detector connected to said Q output of said second D flip-flop and operable to produce enable signals, said driver circuit including an enable input connected to said peak value detector to enable operation thereof in response to said inversely-symmetrical pulse sequences.

9. The erase apparatus of claim 8, and further comprising:
an AND gate including an output connected to said enable input and a plurality of inputs including a first input connected to said peak value detector, and at least one other input connected to receive an enable control signal.

10. The erase apparatus of claim 9, wherein the magnetic layer storage medium is a data memory, in particular a magnetic tape in a magnetic tape recorder cassette, and wherein:
said predetermined erase frequency is greater than 5 MHz.

11. The erase apparatus of claim 9, wherein:
said magnetic layer storage medium is in an audio recorder.

12. The erase apparatus of claim 9, wherein:
said magnetic layer storage medium is in a video recorder.

* * * * *